United States Patent
Kaznocha et al.

(10) Patent No.: US 12,192,249 B2
(45) Date of Patent: Jan. 7, 2025

(54) SYSTEMS AND METHODS FOR DECENTRALIZED SECURITY AGAINST DEFINED AND UNDEFINED THREATS

(71) Applicant: Impart Security Inc., Coral Gables, FL (US)

(72) Inventors: Clifton Kaznocha, Los Angeles, CA (US); Marc Harrison, Seattle, WA (US)

(73) Assignee: Impart Security Inc., Coral Gables, FL (US)

( * ) Notice: Subject to any disclaimer, the term of this patent is extended or adjusted under 35 U.S.C. 154(b) by 299 days.

(21) Appl. No.: 17/933,223

(22) Filed: Sep. 19, 2022

(65) Prior Publication Data

US 2024/0098118 A1    Mar. 21, 2024

(51) Int. Cl.
H04L 29/06    (2006.01)
H04L 9/40    (2022.01)

(52) U.S. Cl.
CPC ........ *H04L 63/205* (2013.01); *H04L 63/1416* (2013.01); *H04L 63/1441* (2013.01)

(58) Field of Classification Search
CPC ............... H04L 63/205; H04L 63/1416; H04L 63/1441
See application file for complete search history.

(56) References Cited

U.S. PATENT DOCUMENTS

| | | | |
|---|---|---|---|
| 7,779,463 B2 * | 8/2010 | Stolfo ................... | G06F 21/554 709/227 |
| 10,728,216 B2 | 7/2020 | Galbreath et al. | |
| 2005/0210291 A1 * | 9/2005 | Miyawaki ........... | H04L 67/1097 726/1 |
| 2017/0126728 A1 * | 5/2017 | Beam ................... | H04L 63/0263 |
| 2021/0344689 A1 * | 11/2021 | Sharifi Mehr ......... | G06F 16/25 |
| 2021/0359978 A1 | 11/2021 | Galbreath et al. | |
| 2023/0344870 A1 * | 10/2023 | Stöttinger ........... | H04L 63/1491 |
| 2024/0095099 A1 * | 3/2024 | Sharma ............... | H04L 63/0428 |

* cited by examiner

*Primary Examiner* — William A Corum, Jr.
(74) *Attorney, Agent, or Firm* — Ansari Katiraei LLP; Arman Katiraei; Sadiq Ansari

(57) ABSTRACT

A decentralized security system and associated methods are implemented by a distributed set of security controllers that independently detect threats and implement attack protections for endpoints based on cumulative threat states that are synchronized across the distributed set of security controllers in a decentralized manner. A particular security controller receives different states associated with different hashed identifiers from the other security controllers, and also receives a request from a client that is directed to a particular endpoint. The particular security controller generates a hashed value from hashing an identifier from the request that identifies the particular endpoint, updates a first state based on the first hashed value matching a hashed identifier that is associated with the first state, and implements a protective action in response to an updated value generated from updating the first state violating a security rule.

19 Claims, 7 Drawing Sheets

SYSTEMS AND METHODS FOR DECENTRALIZED SECURITY AGAINST DEFINED AND UNDEFINED THREATS

BACKGROUND

Independent, centralized, and hybrid network security systems provide a variety of protection for network-accessible endpoints. Independent security systems use a firewall or other security appliance to secure one or more endpoints behind the firewall or other security appliance from attack. Independent security systems are vulnerable to and cannot protect against distributed attacks. For instance, an attacker may send different attack traffic to different endpoints that are protected by different independent security systems. The cumulative attack traffic if directed to one independent security system may be sufficient to implement a protective action at that independent security system, but distribution of the attack traffic across two or more independent security systems may result in the attack going undetected at any single independent security system, thereby circumventing the protections offered by the independent security systems.

Centralized and hybrid network security systems protect against such distributed attacks by aggregating the distributed attack traffic at one central site and activating attack protections based on the aggregated attack traffic. However, the central site is a single point of failure that can leave all endpoints vulnerable if the central site experiences an outage or failure. Moreover, concentrating the attack detection and protection at the central site for two or more endpoints results in delayed action. Specifically, the central site becomes responsible for monitoring traffic at each endpoint and the cumulative traffic across all endpoints, determining isolated or distributed threats based on the monitored threats, and implementing protective actions for each endpoint under its protection. Consequently, the central site may take minutes to detect and respond to an attack. The delayed response may allow the attack to steal and/or access sensitive data, inject malicious code into the endpoints, and/or complete other attack objectives.

DETAILED DESCRIPTION OF PREFERRED EMBODIMENTS

Figure 1:
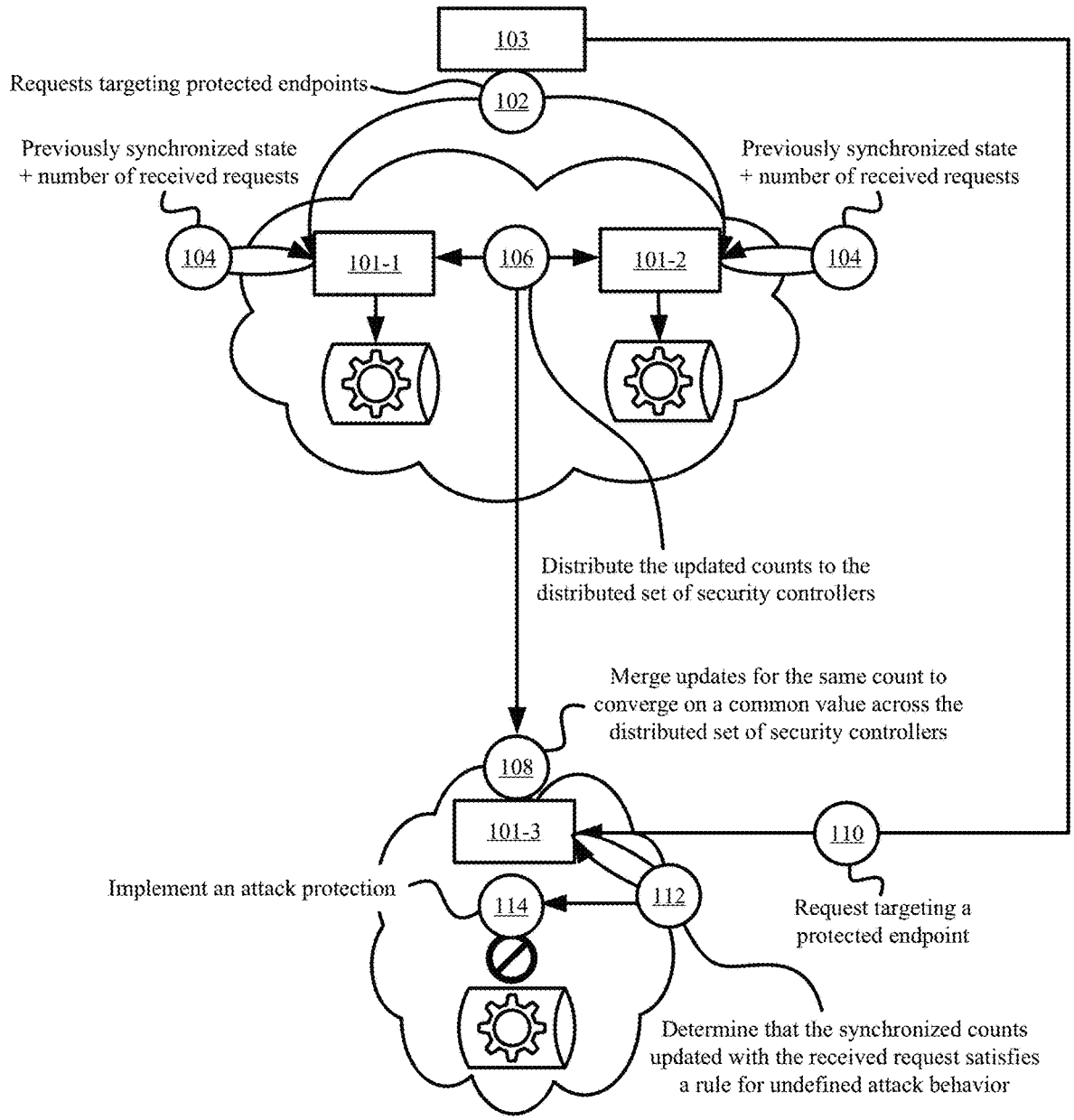
FIG. 1 illustrates an example of providing decentralized security based on cumulative state tracked across a distributed set of security controllers in accordance with some embodiments presented herein.

The following detailed description refers to the accompanying drawings. The same reference numbers in different drawings may identify the same or similar elements.

Provided are systems and methods for decentralized security against defined and undefined threats. The decentralized security is provided by a distributed set of security controllers that independently detect threats and implement attack protections for one or more endpoints based on cumulative threat states that are synchronized across the distributed set of security controllers.

The distributed set of security controllers synchronize, with one another, the states of requests directed to common endpoints and/or the states of common responses that are issued in response to each request. Specifically, the state tracked by each security controller includes the time of a received request, a tag that identifies the request action, and identifiers for the requestor and the targeted endpoint. The tracked states are then synchronized across the distributed set of security controllers in order to determine a cumulative count for each request that targets the same endpoint across the set of distributed security controllers, a cumulative count for each response generated by the particular endpoint across the set of distributed security controllers, and the cumulative traffic issued by different clients across the distributed set of security controllers. As a result of the state synchronization, each security controller has the cumulative state of each potential distributed threat and/or client activity. Upon receiving a request that implicates a particular distributed threat, the security controller receiving that request independently determines if the cumulative state combined with the newly received request violates one or more rules, and takes immediate localized action against the newly received request if a rule is violated without having to receive instruction from a central site, another security controller, or another node of the decentralized security system that does not directly receive the request.

Consequently, each security controller of the decentralized security system described herein is faster to detect and respond to attacks than centralized or hybrid security systems. The centralized or hybrid security systems are reliant on a central site to aggregate the requests, detect threats based on the aggregated requests, and notify individual nodes to take action against the detected threats. Each of these operations must occur in a centralized or hybrid security system before any individual node implements the protections passed down from the central site. The distributed set of security controllers are not subject to any of these limitations.

There is also no single point of failure amongst the distributed set of security controllers or the decentralized security provided by the distributed set of security controllers. If a particular security controller securing a particular endpoint fails or becomes inoperable, the security provided for all other endpoints by the other security controllers from the distributed set of security controllers is maintained. Specifically, any one or more security controllers may be taken offline without affecting the state synchronization across the executing security controllers or the security provided to the endpoints protected by the executing security controllers. The cumulative state of distributed threats and client activity continues to be tracked and shared amongst the executing security controllers even with one or more security controllers going offline at different times.

Moreover, the executing security controllers independently implement new or different attack protections even when other security controllers go offline at different times based on the cumulative state that remains synchronized amongst the executing security controllers. In particular, each executing security controller implements an attack protection based on localized decisions made using the synchronized state maintained by the executing security controllers, new requests received at each executing security controller, and configured rule sets. Accordingly, the security for the one or more endpoints under the protection of the executing security controllers is not compromised when other security controllers go offline or become inoperable.

By tracking the cumulative counts for different potential threats, the distributed set of security controllers are able to protect against defined and undefined attacks. Specifically, the distributed set of security controllers model regular usage and/or access patterns of different endpoints by clients, and detect anomalous behavior occurring at one or more endpoints or anomalous behavior being exhibited by a client based on the cumulative counts tracked for those endpoints or client deviating from the modeled regular usage and/or access patterns. The distributed set of security controllers are therefore able to detect and protect against undefined attacks despite the distributed set of security controllers not being configured with an attack signature for directly identifying the attack packets.

FIG. 1 illustrates an example of providing decentralized security based on cumulative state tracked across a distributed set of security controllers 101 in accordance with some embodiments presented herein. As shown in FIG. 1, the distributed set of security controllers 101 is comprised of first security controller 101-1 protecting at least a first network endpoint from attack, second security controller 101-2 securing at least a second network endpoint from attack, and third security controller 101-3 securing at least a third network endpoint from attack. In some embodiments, the first, second, and third network endpoints are the same or different application programming interfaces ("APIs"), websites, applications, services, and/or other offerings provided by a particular entity. In some other embodiments, the first, second, and third network endpoints are the same or different API calls, website resources, content, application functions, and/or features that are accessible from different network sites or nodes. In other words, client 103 may access the same API or call the same API function from different network sites or nodes that are protected by different security controllers from the distributed set of security controllers 101.

As shown in FIG. 1, first security controller 101-1 and second security controller 101-2 each receive (at 102) a set of requests from client 103 targeting the first network endpoint and the second network endpoint. The requests do not contain a signature of a defined attack and do not violate any rules that protect against defined or known attacks.

First security controller 101-1 and second security controller 101-2 update (at 104) a previously synchronized count for the number of requests received from client 103 across the distributed set of security controllers 101 and/or a previously synchronized count for the number of times each of the first and second network endpoints were requested based on the set of requests issued by client 103. First security controller 101-1 and second security controller 101-2 determine that the updated counts do not violate any rules for a potential threat, and route the requests to the targeted endpoints.

First security controller 101-1 and second security controller 101-2 distribute (at 106) the updated counts for the number of requests received from client 103 and/or the number of requests that target the first network endpoint or the second network endpoint to the other security controllers in the distributed set of security controllers 101. Each count may be associated with a different identifier or hash value that is associated with a particular tracked value (e.g., the number of requests issued by client 103, the number of times a particular endpoint is targeted, etc.).

The distributed set of security controllers 101 track the counts using a conflict-free replicated data type ("CRDT"). Specifically, the distributed set of security controller 101 use the CRDT to merge the differing counts for the requests issued by client 103 across the distributed set of security controllers 101 and/or the requests that are directed to the same network endpoint but issued to different security controllers 101 without conflict and replication. The CRDT ensures that the cumulative count for each tracked state by each security controller 101 converges to a common value over time even when the different updated counts for the same state are received from different security controllers 101. For instance, each time a count is updated, a timestamp and/or an identifier of the security controller updating the count may be associated with the updated count so that when the same count is updated by different security controllers 101 during the same time interval, each of the security controllers 101 may converge the count to a common value that is synchronized across the distributed set of security controllers 101.

Third security controller 101-3 receives (at 110) a request from client 103 that targets the third network endpoint. Third security controller 101-3 updates the cumulative request count from client 103 and/or the cumulative count of network endpoints accessed by client 103. Although the request does not violate rules that are configured for a defined attack, third security controller 101-3 determines (at 112) that the updated count resulting from the received request violates a rule for anomalous behavior and/or attack behavior. For instance, third security controller 101-3 may determine, based on the synchronized counts, the newly received request, and the configured rules, that client 103 issued an anomalous number of requests across the distributed set of security controllers 101 that is indicative of a volumetric attack and/or that client 103 is issuing an irregular request pattern that is indicative of a penetration attack.

Accordingly, third security controller 101-3 implements (at 114) an attack protection that blocks the request from passing to the third network endpoint and/or blocks other packets issued by client 103. Alternatively, tracking the cumulative requests issued by client 103 across the distributed set of security controllers 101 may be indicative of a volumetric attack, and third security controller 101-3 may implement (at 114) a rate limiting protection to limit the client's 103 access to the network endpoints. In either case, third security controller 101-3 implements (at 114) an attack protection based on cumulative state that is tracked by the distributed set of security controllers 101 in a decentralized manner.

In some embodiments, the distributed set of security controller 101 also implement the protective actions in a decentralized manner. Specifically, each security controller 101 implements an attack protection in response to a received request rather than external commands from a central site, other security controllers 101, and/or decision making that is external to the security controller implementing the attack protection. Accordingly, first security controller 101-1 may not implement the same attack protection as third security controller 101-3 until first security controller 101-1 receives another request from client 103 and the cumulative state tracked by the distributed set of security controllers 101 in combination with the received request at third security controller 101-3 violate one or more configured rules for an attack.

Figure 2:
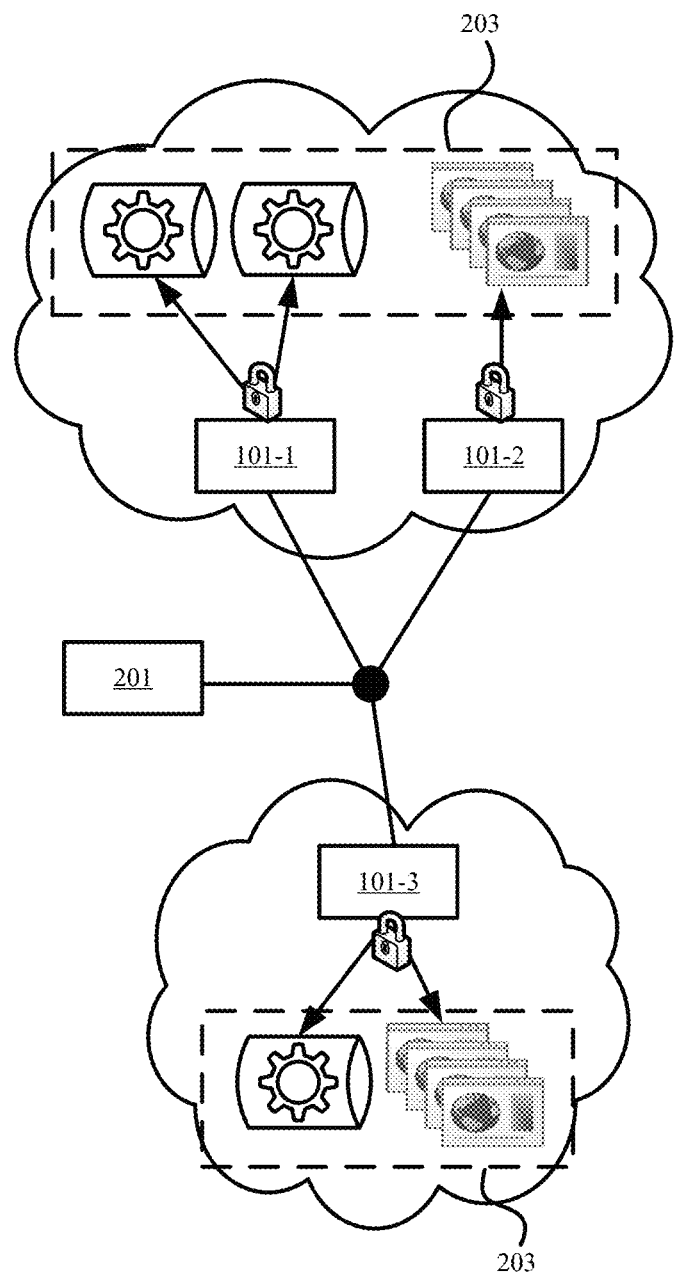
FIG. 2 presents a decentralized security system architecture in accordance with some embodiments presented herein.

FIG. 2 presents decentralized security system architecture 200 in accordance with some embodiments presented herein. Architecture 200 includes the distributed set of security controllers 101, configuration controller 201, and distributed endpoints 203. Although FIG. 2 illustrates the distributed set of security controllers 101 being comprised of first security controller 101-1, second security controller 101-2, and third security controller 101-3, the distributed set of security controllers 101 may be scaled to include more or less security controllers 101 that collectively protect the distributed endpoints 203 operated by the same entity.

A security controller 101 is a device that is deployed and adapted to protect one or more distributed endpoints 203 from attack. Deploying first security controller 101-1 includes routing inbound traffic targeting one or more distributed endpoints 203 protected by first security controller 101-1 through first security controller 101-1 before the inbound traffic reaches the one or more distributed endpoints 203. First security controller 101-1 inspects the traffic and makes decision on whether the traffic is safe to route to the targeted endpoints 203 or whether a protective actions should be taken. In some embodiments, deploying first security controller 101-1 also includes routing outbound traffic originating from the one or more distributed endpoints 203 protected by first security controller 101-1 through first security controller 101-1 before the outbound traffic reaches the intended recipients or clients that requested the outbound traffic from the one or more distributed endpoints 203. First security controller 101-1 may also inspect and analyze the outbound traffic to ensure that private or secure data is not misappropriated and to prevent unauthorized access to certain data from the targeted endpoints 203.

Each security controller 101 includes one or more hardware processors, memory, network resources, and/or other resources for inspecting the inbound and outbound traffic, performing the distributed synchronization of cumulative state, implementing attack protections, and/or performing other security operations as described herein. Security controllers 101 and the associated endpoints 203 may be located in the same or different networks, clouds, or domains.

In some embodiments, security controllers 101 perform a discovery procedure to detect one another and/or to determine the distributed set of security controllers 101 that provide the decentralized security for distributed endpoints 203 of a particular entity. In some embodiments, security controllers 101 use a gossip protocol to distribute the cumulative counts, and use CRDTs to ensure that the update propagated by any one security controller 101 are received by the other security controllers 101 and to further ensure that contemporaneous updates made by different security controllers 101 to the same CRDT converge to the same common value across the distributed set of security controllers 101.

Configuration controller 201 is a node within architecture 200 for administering and/or configuring the rules that each of the distributed set of security controllers 101 uses to detect defined and/or undefined attacks from the cumulative counts and received traffic. The rules exist separate from and are unrelated to the state (e.g., the cumulative counts) that is distributed and synchronized amongst the distributed set of security controllers 101.

Each rule specifies one or more conditions or parameters of an attack. For instance, a rule may specify counts of specific request parameters, sequencing of requests or request values, and/or counts of other values that form the signature or vector of a defined attack. A rule may also specify different counts or request patterns that represent anomalous behavior associated with an undefined attack. In some embodiments, a rule is defined with one or more attack protections or actions that a security controller 101 is to implement in the event the rule is violated and an attack is detected.

Configuration controller 201 distributes the security rules to the distributed set of security controllers 101. In some embodiments, configuration controller 201 distributes newly defined or updated security rules to the distributed set of security controller 101 rather than repeatedly distribute all defined rules. In some embodiments, configuration controller 201 issues commands that invalidate certain rules or cause the distributed set of security controllers 101 to delete one or more previously configured rules.

Configuration controller 201 does not represent a single point of failure because the distributed set of security controllers 101 continue to run and protect distributed endpoints 203 from attacks defined in previously configured rule sets, and the implementation of attack protections by the individual security controllers 101 is not dependent on configuration controller 201, another security controller 101, and/or other external sources.

In some embodiments, if configuration controller 201 provides an updated rule to at least one security controller 101, the at least one security controller 101 may distribute the updated rule to all other security controllers 101 via the gossip protocol should configuration controller 201 cease operations after providing the updated rule to the at least one security controller 101. In some embodiments, a particular security controller 101 may be designated as the configuration controller 201 for the set of distributed security controllers 101 protecting the distributed endpoints 203 of a particular entity.

Distributed endpoints 203 include any network-accessible site, content, service, API call, function, and/or node of the particular entity. Each distributed endpoint 203 is represented by a different Uniform Resource Locator ("URL"), variations in the same URL, or different network identifiers. Accordingly, URLs that invoke the same API call from the same API with different parameters represent different distributed endpoints 203.

The same distributed endpoints 203 may be accessed from different network sites using the same or different network identifiers or URLs. For instance, the same API with same set of functions may be redundantly deployed to different network locations, and two different security controllers 101 may provide the decentralized network security for each API. However, the decentralized network security does not treat the APIs as distinct and independent endpoints. Instead, the distributed set of security controllers 101 track and synchronize the endpoint state at each security controller 101 so that the cumulative state for the distributed API or the same API function being accessed from different network locations is available to each of the security controllers 101 protecting those endpoints.

Figure 3:
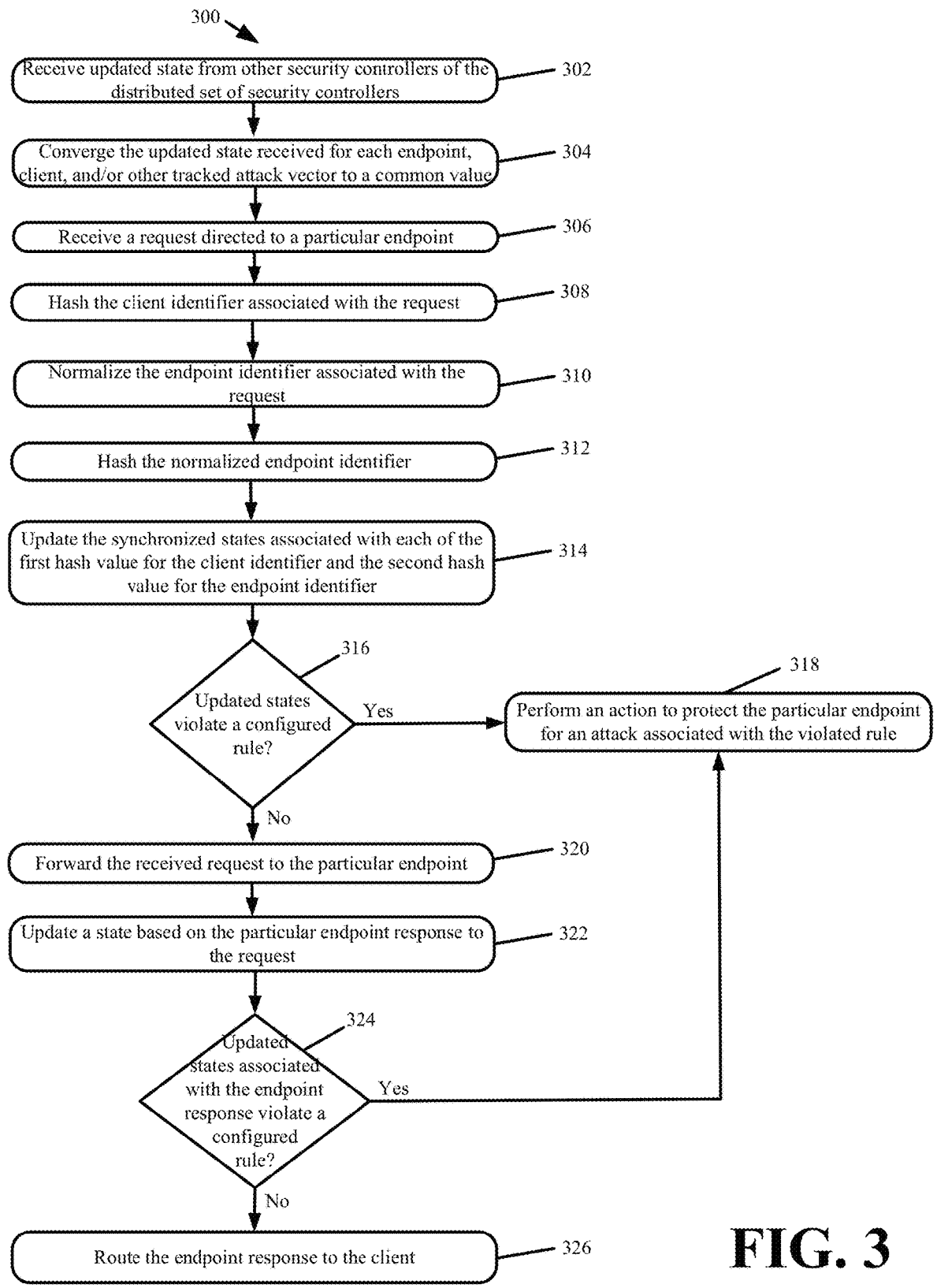
FIG. 3 presents a process for implementing a decentralized attack protection based on the distributed state synchronization in accordance with some embodiments presented herein.

FIG. 3 presents a process 300 for implementing a decentralized attack protection based on the distributed state synchronization in accordance with some embodiments presented herein. Process 300 is implemented by a particular security controller operating as part of a distributed set of security controllers that collectively provide decentralized security for distributed endpoints of a particular entity.

Process 300 includes receiving (at 302) updated state from other security controllers of the distributed set of security controllers providing the decentralized security for the particular entity. The particular security controller may receive (at 302) the updated state as different network messages distributed by different security controllers using a gossip protocol. For instance, each security controller may notify all other security controllers of the distributed set of security controllers when it receives a request that results in an updated state, or may provide periodic updates (e.g., every five seconds) for state that changed during a recurring interval. Accordingly, the particular security controller may continuously receive (at 302) different updates for different tracked states based on requests received by other security controllers of the distributed set of security controllers.

Process 300 includes converging (at 304) the updated state received for each endpoint, client, and/or other tracked attack vector to a common value. Each security controller of the distributed set of security controllers converges (at 304) the updated state so that the state associated with any endpoint, client, and/or other tracked attack vector is synchronized to the same common value across the distributed set of security controllers.

Converging (at 304) the updated state involves using CRDTs and associated policies to resolve conflicts between state updated by different security controllers at the same time or within the same interval, and to determine the current state for the tracked endpoint, client, and/or other tracked attack vector based on the provided updates. In some embodiments, the current state and/or the common value that is synchronized across the distributed set of security controllers for the current state includes a hash value and a count that is associated with the hash value. The hash value represents a specific endpoint, client, and/or other tracked attack vector, and the count is the cumulative number of times that the specific endpoint was requested from the distributed set of security controllers, the cumulative number of requests, messages, and/or packets issued by the client to the distributed set of security controllers, and/or the cumulative number of times the tracked attack vector was detected by any one of the distributed set of security controllers.

Process 300 includes receiving (at 306) a request directed to a particular endpoint. The particular security controller identifies various dimensions or states associated with the request. For instance, the particular security controller identifies the time at which the request was sent or received, a tag for the request action (e.g., the targeted API call, service, content, etc.), and/or identifiers for the requesting device and the particular endpoint that is targeted. The particular endpoint may be identified from the header parameters, URL, cookies, and/or data within the body of the request packet. The particular endpoint may be a specific API, a specific function of the API, a website resource, a specific service, a specific content, and/or other data of the particular entity that may be accessed from one or more network sites, nodes, or locations.

Process 300 includes hashing (at 308) the client identifier associated with the request. The client identifier uniquely identifies the client that issued the request. The client identifier is one or more of the network address, user agent, device signature, login information, token, and/or values associated with the request that individually or collectively identify the device or the device user that issued the request. The distributed set of security controllers are configured with the same hashing algorithms such that the same hash value is generated when the same client issues a request to any one of the distributed set of security controllers. Accordingly, hashing (at 308) the client identifier includes generating a first hash value that uniquely identifies the client issuing the request.

Process 300 includes normalizing (at 310) the endpoint identifier associated with the request. The endpoint identifier identifies what is requested by the client or the resource that is targeted by the client. The endpoint identifier is one or more of the request URL, query string parameters associated with the request URL, a directory or access path specified in the request, a requested filename, header parameters associated with a requested service (e.g., destination Transmission Control Protocol ("TCP") port), an API call, a function call, and/or other values for requesting or accessing the particular endpoint.

Normalizing (at 310) the endpoint identifier includes defining the endpoint identifier to a standard format with a specific ordering or arrangement of values, and/or removing optional or irrelevant parameters or values from the endpoint identifier. For instance, the particular security controller may convert each letter in the endpoint identifier to lower case, may pad numeric values to contain a specific number of digits, and may order URL query string arguments in alphabetic order.

Process 300 includes hashing (at 312) the normalized endpoint identifier. Once again, each of the security controllers from the distributed set of security controllers is configured with the same hashing algorithms such that a hash of the normalized endpoint identifier targeting the same endpoint produces the same hash value at any one of the distributed set of security controllers. Accordingly, hashing (at 312) the normalized endpoint identifier includes generating a second hash value that uniquely identifies the endpoint that is targeted by the request.

Process 300 includes updating (at 314) the synchronized states associated with each of the first hash value for the client identifier and the second hash value for the endpoint identifier. Updating (at 314) the synchronized states includes incrementing the cumulative count for the number of times the client associated with the client identifier has issued a request to any of the distributed set of security controllers, and incrementing the cumulative count for the number of times the particular endpoint identified by the endpoint identifier has been requested at any of the distributed set of security controllers over a tracked duration represented by the synchronized states. In some embodiments, updating (at 314) the synchronized states includes distributing the incremented counts associated with each of the first hash value and the second hash value to the distributed set of security controllers.

Process 300 includes determining (at 316) if the updated states associated with the requesting client or the requested endpoint violate a configured rule. Each of the distributed set of security controllers may be configured with the same ruleset. Each rule of the ruleset defines the one or more conditions associated with a defined or undefined attack. The one or more conditions may specify different thresholds for counts associated with different endpoints, clients, and/or other tracked attack vectors or states. When the thresholds for each of the conditions of a particular rule are exceeded or surpassed, then the particular security controller may determine (at 316) that the particular endpoint identified in the request is being attacked.

In response to determining (at 316—Yes) that the updated states violate a configured rule, process 300 includes performing (at 318) one or more actions to prevent, limit, or mitigate the attack associated with the violated rule. Performing (at 318) the one or more actions includes filtering the incoming traffic based on criteria associated with the one or more actions. The filtering may include blocking, redirecting, forwarding, modifying, and/or otherwise changing the routing of the incoming traffic that violates the configured rule. The filtering may also include requiring the client to perform a CAPTCHA or other authentication before permitting the incoming traffic to reach the targeted endpoints.

In some embodiments, the one or more actions are specified as part of the configured rule. In some other embodiments, the particular security controller classifies the type and/or severity of the attack based on the counts that led to the rule violation, and selects the one or more actions from several actions based on the classified type and/or severity of the attack. For instance, a rate limiting rule violation for protecting against a volumetric attack occurs when a cumulative count of requests sent by a client exceeds a first threshold, and the particular security controller may implement a first action to reduce or rate limit future requests from the client. The severity of the volumetric attack increases when the cumulative count of requests sent by the client exceeds a second threshold. In response to the greater severity, the particular security controller may implement a more restrictive second action that blocks future requests from the client. A vulnerability scanning or penetration attack occurs when the counts for different related endpoints are sequentially accessed, and the particular security controller may implement a third action that requires the client to verify that it is not a bot.

In response to determining (at 316—No) that the updated states do not violate a configured rule, process 300 includes forwarding (at 320) the received request to the particular endpoint, and updating (at 322) one or more states based on the particular endpoint response to the request. Specifically, the particular security controller performs a hash of the endpoint response, and updates a count associated with the resulting hash value. In some embodiments, the particular security controller updates (at 322) the counts based on the endpoint response when the response is an error message or code. For instance, if the forwarded (at 320) request results in HyperText Transfer Protocol ("HTTP") 300, 400, or 500 response codes, API error messages, and/or other invalid status codes, then the particular security controller updates (at 322) the counts associated with the error or status codes along with counts that track the number of error or invalid status codes that result from the client.

In some embodiments, updating (at 322) the states based on the endpoint response includes distributing the updated counts to the other security controllers in the distributed set of security controllers. Once again, the particular security controller may use a gossip protocol and the CRDT to ensure the updated counts associated with the responses provided to the client converge and are synchronized across all security controllers of the distributed set of security controllers.

Process 300 includes determining (at 324) if the states and/or counts associated with the endpoint response violate a configured rule. One or more invalid response codes or error messages occurring in response to messaging from the same client may be indicative of an undefined attack or misuse of the particular endpoint by the client even though the requests by the client are valid and do not contain malicious content.

In response to determining (at 324—Yes) that the states and/or counts associated with the endpoint response violate a configured rule, process 300 includes performing (at 318) one or more actions to prevent, limit, or mitigate the attack associated with the violated rule. In this instance, the one or more actions may block the endpoint response from reaching the client. For instance, the particular security controller may determine that the client is scraping or stealing sensitive data from the endpoint based on the rule that is violated by the response counts (e.g., the number of 404 response codes issued in response to requests from the client exceeding a rule threshold), and may prevent the data being returned by the endpoint from routing to the client. Additionally, the particular security controller may block further requests of the client from reaching one or more endpoints that are protected by that particular security controller.

In response to determining (at 324—No) that the states and/or counts associated with the endpoint response do not violate a configured rule, process 300 includes routing (at 326) the endpoint response to the client. In other words, the particular security controller does not detect any rule violations or the presence of a defined or undefined attack in the request or the endpoint response, and permits the traffic to flow uninterrupted between the client and the endpoint.

Figure 4:
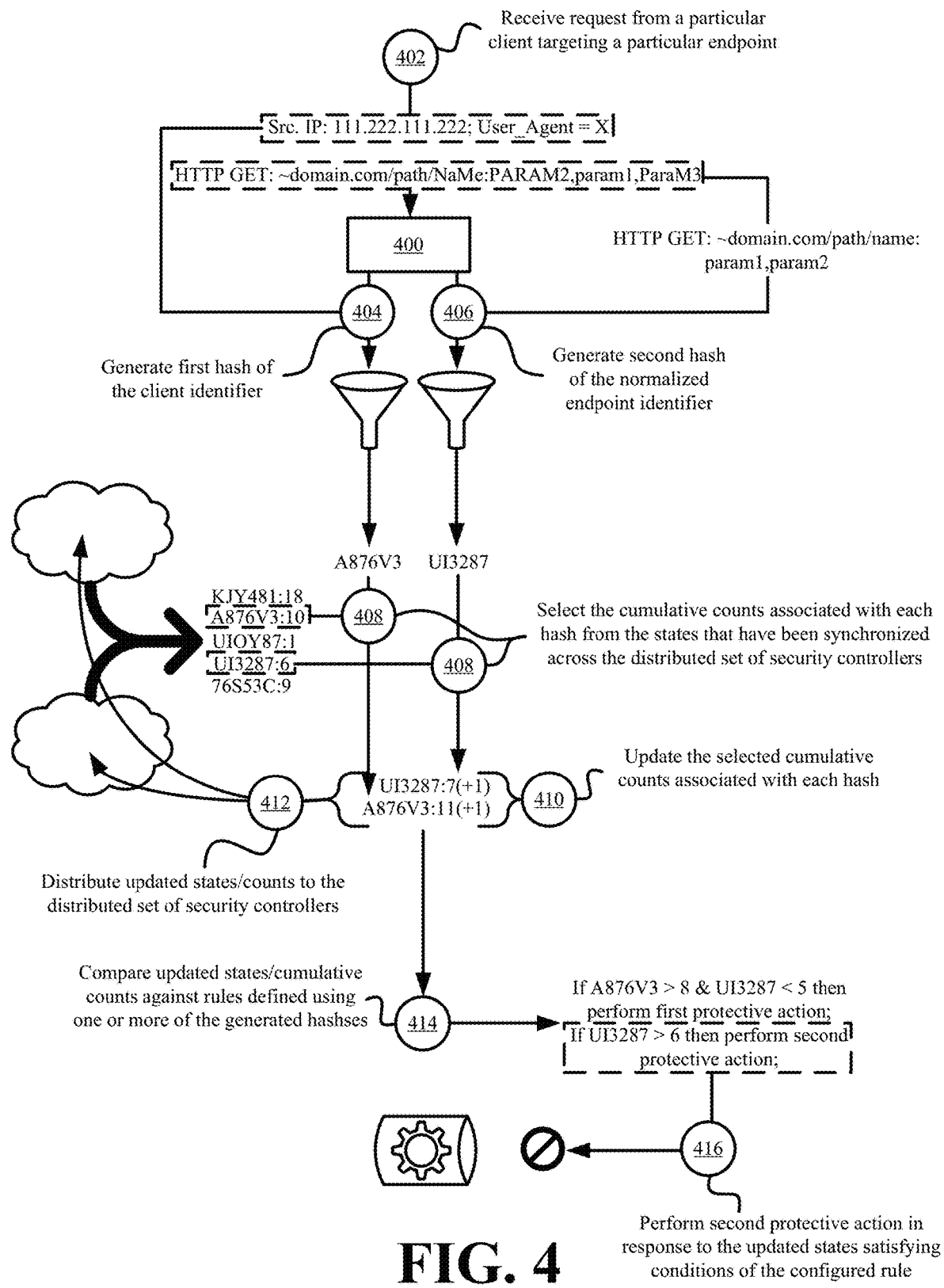
FIG. 4 illustrates an example of the decentralized security hashing performed by the distributed set of security controllers in accordance with some embodiments presented herein.

FIG. 4 illustrates an example of the decentralized security hashing performed by the distributed set of security controllers in accordance with some embodiments presented herein. As shown in FIG. 4, security controller 400 receives (at 402) a packet or message with a URL for requesting data from a particular endpoint and/or accessing the particular endpoint.

Security controller 400 generates (at 404) a first hash value based on a client identifier obtained from the packet or message. In this example, the client identifier is a combination of the client's Internet Protocol ("IP") address and the user agent. Security controller 400 also generates (at 406) a second hash value from the normalized request URL.

Security controller 400 selects (at 408) the cumulative counts associated with each of the first and second hashes from the states that have been synchronized across the distributed set of security controllers. The synchronized states represent different cumulative counts associated with different client identifiers, endpoint identifiers, and endpoint responses that the distributed set of security controllers share with one another and that are synchronized to a common value across the distributed set of security controllers using the CRDT.

Security controller 400 updates (at 410) the selected cumulative counts associated with the first and second hashes, distributes (at 412) the updated cumulative counts to the distributed set of security controllers, and compares (at 414) the updated cumulative counts against rules that are defined to apply to the first and second hashes. In other words, security controller 400 need not compare the updated states and/or counts against each and every configured rule. Instead, security controller 400 compares (at 414) the updated cumulative counts against the subset of configured rules that include one or more of the updated hashes in the rule definition.

In response to one or more the updated cumulative counts satisfying the conditions or thresholds set in a rule, security controller 400 implements (at 416) the attack protection associated with that rule. As shown in FIG. 4, blocks the packet or message from reaching the requested endpoint as a result of security controller 400 implementing (at 416) the attack protection.

The rules and the attack protections implemented by the distributed set of security controllers may also be defined relative to cumulative counts that are generated from hashing the responses that are generated by the endpoints as well as the hashing of the client identifier and/or the endpoint identifier of the request. The cumulative counts resulting from the hashed endpoint responses provide additional information for diagnosing and detecting different types of attacks that may go undetected when analyzing the volume of requests generated by different clients and the endpoints that are requested across the distributed set of security controllers.

Figure 5:
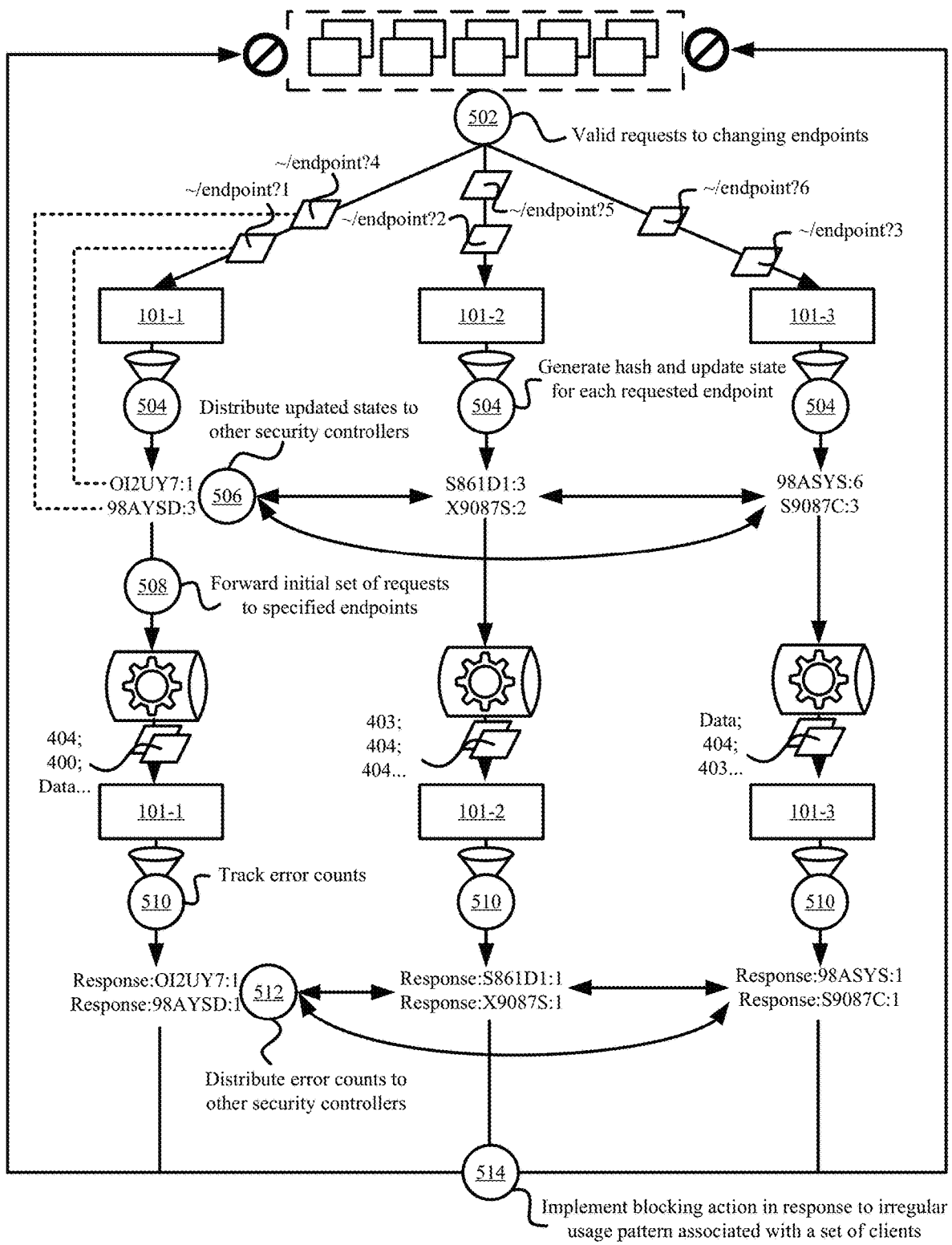
FIG. 5 illustrates an example of using the endpoint response hash to provide additional decentralized protections for the endpoints in accordance with some embodiments presented herein.

FIG. 5 illustrates an example of using the endpoint response hash to provide additional decentralized protections for the endpoints in accordance with some embodiments presented herein. As shown in FIG. 5, a distributed botnet submits (at 502) valid requests to scan for endpoint vulnerabilities, and distributes the requests across distributed set of security controllers 101 to try and hide the attack. Each request is slightly different than a previously submitted request such that the endpoint hash of each request is different.

Distributed set of security controllers 101 generate (at 504) the different endpoint hashes, and share (at 506) the results with one another in order to track the cumulative count associated with each endpoint hash. Since an initial set of requests do not violate any configured rules, distributed set of security controllers 101 forward (at 508) the initial set of requests to the specified endpoints.

Each of the distributed set of security controllers 101 tracks (at 510) the endpoint responses resulting from the initial set of requests of the distributed botnet. The requests produce various error codes, distributed set of security controllers 101 tracks (at 510) the cumulative state of the error codes. Tracking (at 510) the endpoint responses includes associating a count of each generated error code with the endpoint hash and client hash.

Distributed set of security controllers 101 share (at 512) the tracked error counts with one another, and determine that the initial set of requests from the distributed botnet created a pattern of anomalous behavior that is indicative of endpoint misuse (e.g., an undefined attack). Specifically, by associating the cumulative error counts tracked across distributed set of security controllers 101 back to the client hashes associated with the distributed botnet, each security controller 101 detects that the distributed botnet does not access the endpoints according to a regular usage pattern and that the irregular usage results in an abnormal number of error codes being returned from the targeted endpoints. Consequently, distributed set of security controller 101 protects the endpoints from this abnormal behavior despite the attack being distributed across different endpoints in different network locations and the attack consisting of otherwise valid requests.

In response to detecting the undefined attack based on the irregular pattern and relationship emerging between the cumulative error counts of the endpoint identifier hashes and the endpoint response hashes, each security controller 101 performs (at 514) an action to block a second set of requests from any client associated with the distributed botnet, block requests that follow the irregular usage or access pattern of the endpoints (e.g., incrementing of an endpoint value), and/or block endpoint responses resulting from the irregular usage or access pattern of the endpoints.

Since each change in a request (e.g., change in the request header, URL, and/or other request values) may result in a different hash being generated, some embodiments expire the synchronized counts or the tracked state for hashes that have not been updated or accessed for some expiration duration. In doing so, the distributed set of security controllers reduce the amount of cross traffic that is generated between the distributed set of security controllers as well as the memory overhead required from each security controller. In other words, the expiration reduces the number of hashes and/or counts that each security controller retains in memory.

Whenever a security controller receives a request that results in a hash being generated and a cumulative count associated with that hash being updated, the security controller associates a timestamp to track the last time the cumulative count was updated. Each security controller may periodically (e.g., every 5 minutes, 10 minutes, etc.) scan its local memory or cache to identify any cumulative counts with a timestamp that is older than a specific interval, and may remove the expired cumulative counts from the local memory or cache.

The rules for activating the various attack protections may be defined based on any number or combination of the cumulative counts to detect a variety of defined and undefined attacks. In some embodiments, artificial intelligence and/or machine learning ("AI/ML") techniques are used to model regular usage or access patterns, and to automatically generate rules to block clients or requests that violate the modeled regular usage or access patterns.

In some embodiments, modeling the regular usage or access patterns includes identifying a maximum number of requests that any valid client issues to one or more endpoints over a period of time, and defining a rule for an undefined attack when the cumulative count associated with a client identifier exceeds the maximum number of numbers. In some embodiments, modeling the regular usage or access patterns includes tracking the ratio with which different endpoints are requested over time, and defining a rule for an undefined attack based on the proportion for the cumulative counts associated with different endpoints deviating from the tracked regular usage or access patterns by more than a threshold amount. In some embodiments, modeling the regular usage or access patterns includes tracking the ratio of requests that result in error or invalid status codes being returned from the endpoints, and defining a rule for an undefined attack based on the proportion for the cumulative counts associated with the endpoint responses having a disproportionate number of error or invalid status codes relative to the tracked ratio.

The AI/ML modeling may generate more complex usage patterns from different combinations of cumulative counts. For instance, a more complex usage pattern that may be modeled by the AI/ML modeling may include determining that clients submitting a first request for a first endpoint that produces a first endpoint result, follow that first request with a specific second request to a second endpoint that produces a second endpoint result 80% of the time, and follow that second request with a specific third request to a third endpoint that produce a third endpoint result 60% of the time. A rule may be defined based on this example usage pattern, and each security controller may be configured with the rule.

The rule is effectuated once any security controller receives the first request. The hash or count identifying the first request from the client is distributed across the distributed set of security controller such that any security controller is able to verify whether the client follows the regular usage pattern in subsequent requests or violates the rule by deviating from the regular usage pattern with the subsequent requests that may be issued to different security controllers in the distributed set of security controllers.

In this manner, the distributed set of security controllers detect and protect against defined attacks as well as undefined attacks that do not have a unique signature but that exhibit anomalous behavior that deviates from modeled regular usage or access patterns. Accordingly, the distributed set of security controllers are able to adapt to and prevent new threats without any prior knowledge or encounters with those threats. The decentralized architecture and the sharing of the synchronized and converged state across the distributed set of security controllers also prevents an attacker from disguising or hiding an attack by distributing the attack traffic to different endpoints or network sites.

Figure 6:
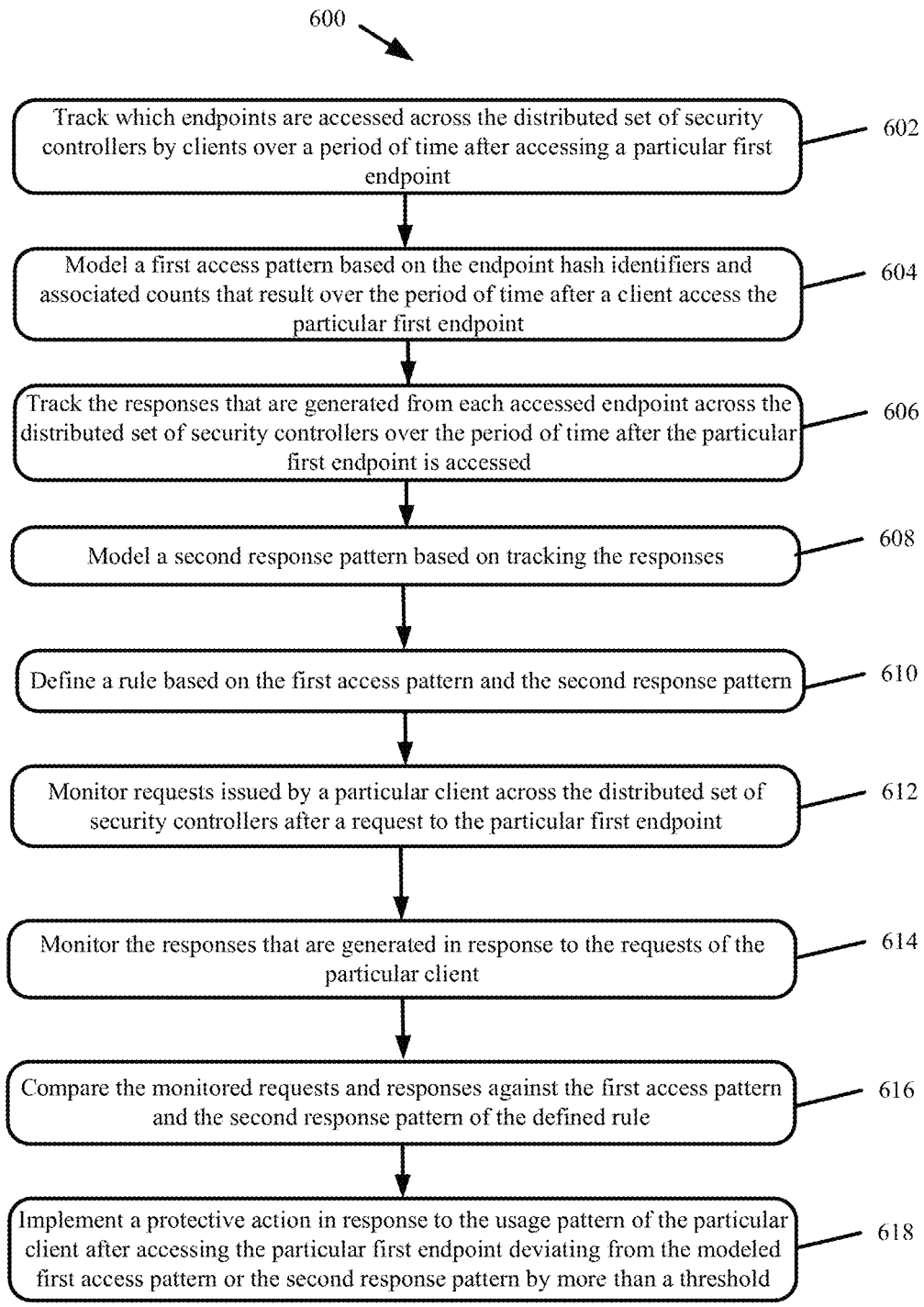
FIG. 6 presents a process for modeling attack behavior based on the cumulative counts synchronized across the distributed set of security controllers in accordance with some embodiments.

FIG. 6 presents a process 600 for modeling attack behavior based on the cumulative counts synchronized across the distributed set of security controllers in accordance with some embodiments. Process 600 is performed by one or more of the distributed set of security controllers.

Process 600 includes tracking (at 602) which endpoints are accessed across the distributed set of security controllers by clients over a period of time after accessing a particular first endpoint. In some embodiments, the tracking (at 602) involves storing the endpoint hash identifiers and counts for those endpoint hash identifiers that result over the period of time after a request for the particular first endpoint is issued by different clients. The particular first endpoint may include any endpoint that is common starting point for a user session or could include any random endpoint.

Process include modeling (at 604) a first access pattern based on the endpoint hash identifiers and associated counts that result over the period of time after a client access the particular first endpoint. Modeling (at 604) the first access pattern may include analyzing the sequencing with which the endpoint hash identifiers are generated after the particular first endpoint is accessed, determining the probabilities with which each sequence occurs or the probability with which a specific endpoint is accessed after the particular first endpoint and each endpoint in the sequence, and defining a model for the first access pattern based on the probabilities. Modeling (at 604) the first access pattern may also include determining the frequency with which different endpoints are access by clients after accessing the first particular endpoint based on the counts associated with the endpoint hash identifiers, and defining a model for the first access pattern based on the frequencies.

Process 600 includes tracking (at 606) the responses that are generated from each accessed endpoint across the distributed set of security controllers over the period of time after the particular first endpoint is accessed. For instance, tracking (at 606) the responses may include determining what percent of the responses resulted in different error codes being returned. Process 600 includes modeling (at 608) a second response pattern based on tracking (at 606) the responses.

Process 600 includes defining (at 610) a rule based on the first access pattern and the second response pattern. The rule may specify the different probabilities with which endpoints are accessed after the particular first endpoint and the probability of various responses being issued.

Process 600 includes monitoring (at 612) requests issued by a particular client across the distributed set of security controllers after a request to the particular first endpoint, and monitoring (at 614) the responses that are generated in response to the requests of the particular client. Specifically, the distributed set of security controllers may track the counts associated with the accessed endpoints and the generated responses.

Process 600 includes comparing (at 616) the monitored (at 612) requests and monitored (at 614) responses against the first access pattern and the second response pattern of the defined (at 610) rule. Process 600 includes implementing (at 618) a protective action in response to the usage pattern of the particular client after accessing the particular first endpoint deviating from the modeled first access pattern or the second response pattern by more than a threshold.

Figure 7:
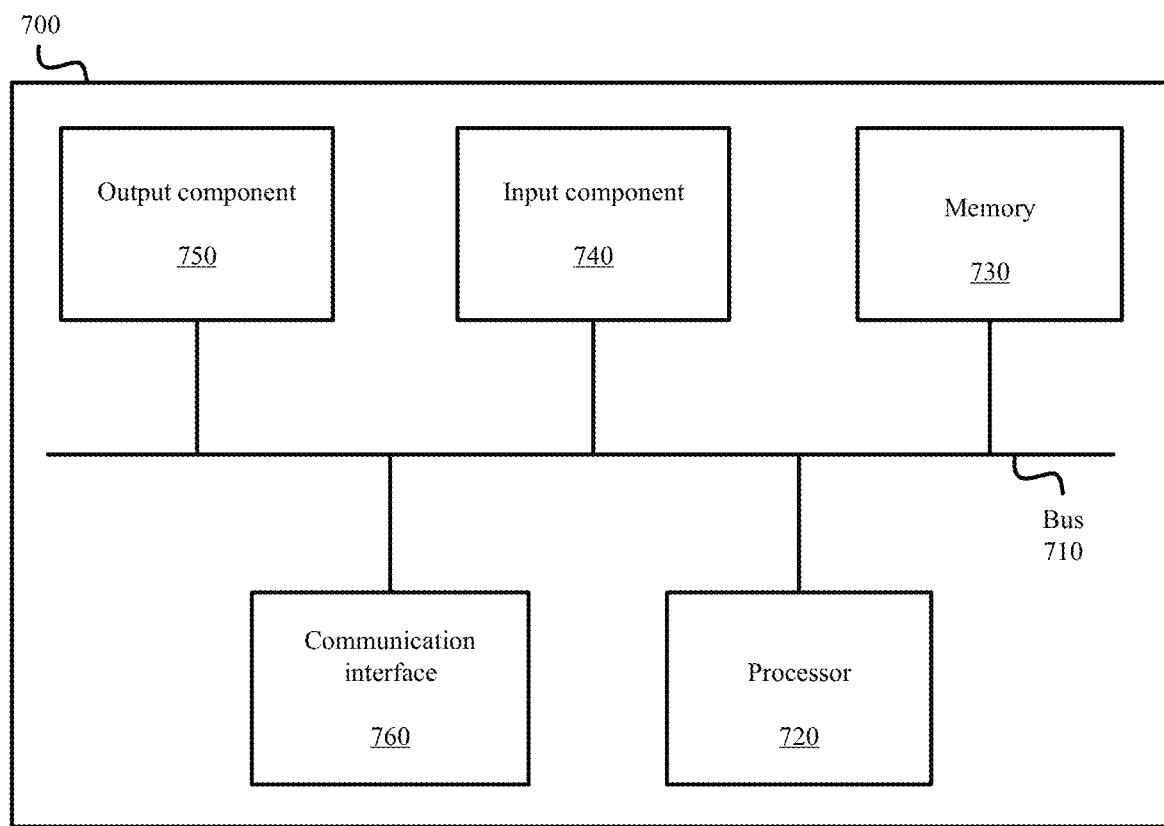
FIG. 7 illustrates example components of one or more devices, according to one or more embodiments described herein.

FIG. 7 is a diagram of example components of device 700. Device 700 may be used to implement one or more of the devices or systems described above (e.g., a security controller, the endpoints, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving, at a particular security controller of a decentralized security system, a plurality of states associated with different hashed identifiers from a plurality of other security controllers of the decentralized security system;
    receiving, at the particular security controller, a request from a particular client that is directed to a particular endpoint;
    generating, by execution of the particular security controller, a first hashed value from hashing an identifier from the request that identifies the particular endpoint;
    updating, by execution of the particular security controller, a first state of the plurality of states based on the first hashed value matching a hashed identifier that is associated with the first state, wherein the first state is a first cumulative count representing a number of times the particular endpoint is requested across the decentralized security system, and wherein a second state of the plurality of states represents a number of requests received from the particular client across the decentralized security system; and
    implementing, at the particular security controller, a protective action in response to an updated value generated from updating the first state violating a security rule.

2. The method of claim 1 further comprising:
    converging each particular state of the plurality of states to a common value in response to different security controllers of the plurality of other security controllers providing different values for one or more of the plurality of states.

3. The method of claim 1 further comprising:
    distributing the updated value for the first state from the particular security controller to the plurality of other security controllers in response to the updating of the first state.

4. The method of claim 1, wherein implementing the protective action comprises:
    blocking the request at the particular security controller before the request reaches the particular endpoint.

5. The method of claim 1, wherein generating the first hashed value comprises:
    normalizing one or more of a Uniform Resource Locator ("URL") or a function call for accessing the particular endpoint to a standard format; and
    hashing the one or more of the URL or the function call after said normalizing.

6. The method of claim 1 further comprising:
generating a second hashed value from hashing an identifier from the request that identifies the particular client;
updating the second state based on the second hashed value matching a hashed identifier that is associated with the second state; and
implementing a different second protective action in response to the second state violating a different second security rule after the updating of the second state.

7. The method of claim 6,
wherein implementing the protective action comprises blocking the request from reaching the particular endpoint, and
wherein implementing the different second protective action comprises rate limiting a number of requests issued by the particular client.

8. The method of claim 1 further comprising:
forwarding the request to the particular endpoint in response to the updated value not violating the security rule;
receiving a response from the particular endpoint as a result of forwarding the request;
generating a second hashed value from hashing the response;
updating a third state of the plurality of states based on the second hashed value matching a hashed identifier that is associated with the third state; and
implementing a different second protective action in response to the third state violating a different second security rule after the updating of the third state.

9. The method of claim 1 comprising:
determining an irregular usage pattern from the particular client based on the updated value for the first state and a value associated with at least one other state of the plurality of states deviating from a modeled regular usage pattern; and
implementing the protective action against the particular client in response to the determining of the irregular usage pattern.

10. The method of claim 1 further comprising:
determining that a first count, that results from the updating of the first state, and a second count, that is associated with at least one other state of the plurality of states, deviate from counts of a modeled usage; and
implementing the protective action against the particular client in response to the first count and the second count deviating from the counts of the modeled usage.

11. A decentralized security system comprising:
a plurality of security controllers providing network security for a plurality of endpoints, wherein a particular security controller of the plurality of security controllers comprises one or more hardware processors configured to:
receive a plurality of states associated with different hashed identifiers from one or more other security controllers of the plurality of security controllers;
receive a request from a particular client that is directed to a particular endpoint;
generate a first hashed value from hashing an identifier from the request that identifies the particular endpoint;
update a first state of the plurality of states based on the first hashed value matching a hashed identifier that is associated with the first state, wherein the first state is a first cumulative count representing a number of times the particular endpoint is requested across the decentralized security system, and wherein a second state of the plurality of states represents a number of requests received from the particular client across the decentralized security system; and
implement a protective action in response to an updated value generated from updating the first state violating a security rule.

12. The decentralized security system of claim 11, wherein the one or more hardware processors are further configured to:
converge each particular state of the plurality of states to a common value in response to the one or more other security controllers providing different values for one or more of the plurality of states.

13. The decentralized security system of claim 11, wherein the one or more hardware processors are further configured to:
distribute the updated value for the first state to other security controllers of the plurality of security controllers.

14. The decentralized security system of claim 11, wherein implementing the protective action comprises:
blocking the request at the particular security controller before the request reaches the particular endpoint.

15. The decentralized security system of claim 11, wherein generating the first hashed value comprises:
normalizing one or more of a Uniform Resource Locator ("URL") or a function call for accessing the particular endpoint to a standard format; and
hashing the one or more of the URL or the function call after said normalizing.

16. The decentralized security system of claim 11, wherein the one or more hardware processors are further configured to:
generate a second hashed value from hashing an identifier from the request that identifies the particular client;
update the second state based on the second hashed value matching a hashed identifier that is associated with the second state; and
implement a different second protective action in response to the second state violating a different second security rule after the updating of the second state.

17. The decentralized security system of claim 11, wherein the one or more hardware processors are further configured to:
forward the request to the particular endpoint in response to the updated value not violating the security rule;
receive a response from the particular endpoint as a result of forwarding the request;
generate a second hashed value from hashing the response;
update a third state of the plurality of states based on the second hashed value matching a hashed identifier that is associated with the third state; and
implement a different second protective action in response to the third state violating a different second security rule after the updating of the third state.

18. The decentralized security system of claim 11, wherein the one or more hardware processors are further configured to:
determine an irregular usage pattern from the particular client based on the updated value for the first state and a value associated with at least one other state of the plurality of states deviating from a modeled regular usage pattern; and implement the protective action against the particular client in response to the determining of the irregular usage pattern.

19. A non-transitory computer-readable medium storing program instructions that, when executed by one or more hardware processors, cause a particular security controller of a decentralized security system to perform operations comprising:

receive a plurality of states associated with different hashed identifiers from a plurality of other security controllers of the decentralized security system;

receive a request from a particular client that is directed to a particular endpoint;

generate a first hashed value from hashing an identifier from the request that identifies the particular endpoint;

update a first state of the plurality of states based on the first hashed value matching a hashed identifier that is associated with the first state, wherein the first state is a first cumulative count representing a number of times the particular endpoint is requested across the decentralized security system, and wherein a second state of the plurality of states represents a number of requests received from the particular client across the decentralized security system; and implement a protective action in response to an updated value generated from updating the first state violating a security rule.

* * * * *